(12) United States Patent
Haisch et al.

(10) Patent No.: US 7,193,773 B2
(45) Date of Patent: *Mar. 20, 2007

(54) STEREOMICROSCOPY METHOD AND STEREOMICROSCOPY SYSTEM

(75) Inventors: Michael Haisch, Aalen (DE); Ludwin Monz, Mainz (DE)

(73) Assignee: Carl-Zeiss-Stiftung, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/356,871

(22) Filed: Feb. 3, 2003

(65) Prior Publication Data

US 2003/0151810 A1 Aug. 14, 2003

(30) Foreign Application Priority Data

Feb. 4, 2002 (DE) ................ 102 04 430

(51) Int. Cl.
G02B 21/22 (2006.01)
A61B 5/05 (2006.01)

(52) U.S. Cl. .............. 359/376; 600/424; 600/425

(58) Field of Classification Search ........ 359/376–378; 600/424–426, 429
See application file for complete search history.

(56) References Cited

U.S. PATENT DOCUMENTS

| 4,498,778 | A | 2/1985 | White .............. 356/376 |
| 4,628,469 | A | 12/1986 | White .............. 364/560 |
| 4,863,252 | A | 9/1989 | McCarthy et al. |
| 5,446,834 | A | 8/1995 | Deering ............ 395/127 |
| 5,510,832 | A | 4/1996 | Garcia .............. 348/56 |
| 5,579,772 | A | 12/1996 | Kinukawa et al. ..... 128/665 |
| 5,694,142 | A | 12/1997 | Dumoulin et al. ..... 345/9 |
| 5,823,958 | A | 10/1998 | Truppe ............ 600/426 |
| 5,841,149 | A | 11/1998 | Spink et al. ....... 250/559.29 |
| 5,850,352 | A | 12/1998 | Moezzi et al. ...... 364/514 A |
| 5,868,675 | A | 2/1999 | Henrion et al. ..... 600/424 |

(Continued)

FOREIGN PATENT DOCUMENTS

DE 690 22 063 T2 6/1996

(Continued)

OTHER PUBLICATIONS

European Search Report dated Nov. 14, 2003 (3 pages).

(Continued)

*Primary Examiner*—Mark A. Robinson
*Assistant Examiner*—Lee Fineman
(74) *Attorney, Agent, or Firm*—Osha Liang LLP

(57) ABSTRACT

A stereomicroscopy system and method for generating at least a pair of representations of an object 7 for observation a user 9 are provided, comprising a detection system 15 for providing radiation data corresponding to detected radiation emanating from a region 17 of the object, a position detection apparatus 29 for detecting a position of the user, a location determination device 23 for determining a first and a second location in an object coordinate system 25, an image data generation device 23 for generating image data from the radiation data for a first representation and a second representation representing the region of the object viewed from the first and second locations, respectively, and a display apparatus 75 for displaying the first representation for a left eye of the user and for displaying the second representation for a right eye of the user as a function of the image data.

20 Claims, 9 Drawing Sheets

U.S. PATENT DOCUMENTS

| | | | |
|---|---|---|---|
| 5,870,220 A | 2/1999 | Migdal et al. | 359/216 |
| 5,961,456 A | 10/1999 | Gildenberg | 600/429 |
| 5,999,840 A | 12/1999 | Grimson et al. | 600/424 |
| 6,044,170 A | 3/2000 | Migdal et al. | 382/154 |
| 6,084,979 A | 7/2000 | Kanade et al. | 382/154 |
| 6,133,945 A * | 10/2000 | Stuettler | 348/51 |
| 6,163,336 A | 12/2000 | Richards | 348/42 |
| 6,165,181 A | 12/2000 | Heilbrun et al. | 606/130 |
| 6,525,878 B1 * | 2/2003 | Takahashi | 359/466 |
| 6,608,884 B1 * | 8/2003 | Mazess et al. | 378/98 |
| 6,690,964 B2 * | 2/2004 | Bieger et al. | 600/424 |
| 2002/0054429 A1 * | 5/2002 | Engelhardt et al. | 359/368 |
| 2004/0017607 A1 * | 1/2004 | Hauger et al. | 359/376 |

FOREIGN PATENT DOCUMENTS

| | | |
|---|---|---|
| DE | 100 08 806 A1 | 12/2001 |
| EP | 0 845 693 A1 | 6/1998 |
| WO | WO91/04711 | 4/1991 |
| WO | WO92/03021 | 2/1992 |
| WO | WO92/11735 | 7/1992 |
| WO | WO 99/38449 | 8/1999 |

OTHER PUBLICATIONS

"Three-dimensional topometry with stero microscopes", R. Windecker et al., Optical Engineering, vol. 36 No. 12, 3372-3377, Dec. 1997 (6 pages).

German Search Report dated Sep. 24, 2002 (2 pages).

Kjell Carlsson and Nils Aslund, "Confocal imaging for 3-D digital microscopy", article from "Applied Optics", dated Aug. 15, 1987, 7 pages, vol. 26, No. 16, Published by the 1987 Society of America, Stockholm, Sweden.

* cited by examiner

STEREOMICROSCOPY METHOD AND STEREOMICROSCOPY SYSTEM

FIELD OF THE INVENTION

The invention relates to a stereomicroscopy method and a stereomicroscopy system for producing at least a pair of representations of an object to be viewed by at least one user.

BACKGROUND OF THE INVENTION

The stereomicroscopy method according to the invention and the stereomicroscopy system according to the invention serve to produce stereoscopic representations of an object such that, when viewing the representations, the user obtains a three-dimensional impression of the representations. To this end, it is necessary for the left eye and the right eye of the user to perceive different representations of the object from different directions of view onto the object.

An example of a conventional stereomicroscopy system is a stereomicroscope. A beam path of a conventional stereomicroscope is schematically shown in FIG. 1. The stereomicroscope 901 shown there comprises an objective 903 with an optical axis 905 and an object plane 907 in which an object to be viewed is positioned. A beam bundle 911 emanating from the object and object plane 907, respectively, in a solid angle region 909 around the optical axis 905 images the objective 903 to infinity and thus converts it into a parallel beam bundle 913. Two zoom systems 915, 916, each having an optical axis 917 and 918, respectively, of its own are positioned adjacent each other in the parallel beam bundle 913 such that the optical axes 917 and 918 of the zoom systems are offset parallel to the optical axis 905 of the objective 903 and spaced apart from each other by a distance a. The two zoom systems 915, 916 each feed a partial beam bundle 919 and 920, respectively, out of the parallel beam bundle 913, with one partial beam bundle 919 being supplied to a left eye 921 of the user and the other partial beam bundle 920 being supplied to a right eye 922 of the user. To this end, a field lens 923, a prism system 925 and an ocular 927 are disposed in the beam path of each partial beam bundle 919, 920. As a result, the left eye 921 perceives the object 907 in a representation inclined at a viewing angle α in respect of the optical axis 5, while the right eye 922 perceives the object 907 in a representation inclined at a viewing angle −α in respect of the optical axis 905, as a result of which the user gets the stereoscopic, three-dimensional impression of the object.

FIG. 2 shows part of a beam path of a further conventional microscope 901 for providing a stereoscopic representation of an object for observation by two users. Similar to the microscope shown in FIG. 1, an objective 903 produces a parallel beam bundle from a beam bundle 911 emanating from the object in a solid angle region, with two zoom systems 915 and 916 being provided, each feeding a partial beam bundle 919 and 920, respectively, out of the parallel beam bundle, said zoom systems supplying, via field lenses 923 and prism systems and oculars not shown in FIG. 2, representations of the object to the two eyes of a first user.

In the parallel beam path, there are further disposed two mirrors 931 which feed two further partial beam bundles 933 and 934 out of the parallel beam path and reflect the same such that they extend transversely to the beam direction of the partial beam bundles 919, 920. The two partial beam bundles 933 and 934 are each supplied, via a zoom system 935 and 936, respectively, and prism systems and oculars, likewise not shown in FIG. 2, to the two eyes of a second user.

In order for this microscope to be used by two users, it is required that, while observing the object, the two users are constantly in a fixed spatial position relative to the object and the microscope, respectively, and also relative to each other. In particular, if the microscope is used as surgical microscope during a surgical operation, this fixed spatial allocation is obstructive for the two users who must operate as surgeons in the operating field.

Accordingly, it is an object of the present invention to provide a stereomicroscopy method and a stereomicroscopy system which offers degrees of freedom for at least one user as regards his position relative to the object to be viewed.

SUMMARY OF THE INVENTION

To this end, the invention proceeds from the finding that in the conventional microscopes shown in FIGS. 1 and 2 the radiation emanating from the object and processed by the objective, that is, the radiation emanating from the object towards the objective in the solid angle region and the parallel beam bundle passed on by the objective, respectively, comprise sufficient spatial information about the object to allow to produce therefrom stereoscopic representations of the object from a plurality of directions of view onto the object. Furthermore, it was found that merely the conventional way of using the information contained in the radiation emanating from the object, that is, the feeding of individual partial beam bundles out of the complete parallel beam bundle by the zoom systems and mirrors of the conventional microscopes shown in FIGS. 1 and 2 has a limiting effect on the position of the users and the directions of view thereof onto the object.

Therefore, the invention proposes a stereomicroscopy method and a stereomicroscopy system, wherein a position of the user relative to a fixed point in a user coordinate system is detected. Dependent upon the position of the user in his user coordinate system, two locations relative to a region of the object to be observed are then determined in an object coordinate system. A first one of the two locations is allocated to the left eye of the user, while a second one of the two locations is allocated to the right eye of the user. Connecting lines between the thus determined locations and the region of the object to be observed define directions of view onto the object from which representations are produced by the method and the system which are supplied to the left eye and the right eye, respectively, of the user. These representations are produced by a stereoscopic display which receives corresponding image data. The image data supplied to the display are, in turn, produced from radiation data which are generated by a detector system which detects radiation emanating from the region of the object under observation.

The image data are produced from the radiation data dependent upon the two determined locations, that is, a virtual direction of view of the user onto the object. In this respect, it is, in particular, also possible to already carry out the detection of the radiation emanating from the object dependent upon these two locations so that the conversion of radiation data into the image data can be performed with more ease, or the radiation data can be used directly as image data.

All in all, when viewing the two representations of the stereo display device, the user obtains an impression of the object which is comparable to an impression which he would obtain if he viewed the object directly through a conventional stereomicroscope shown in FIG. 1 or 2. However, the user can change his position relative to the fixed point in the user coordinate system. As a result, representations of the object, which have been changed corresponding to his new position, are presented to him. When selecting his virtual direction of view onto the object, the user is thus not limited by the fixed optics of the conventional stereomicroscope.

Preferably, the generation of the image data from the radiation data comprises, first, the generation of a data model which is representative of the object and, further, the generation of the image data for the two representations from the data model. Here, the data model is at least partially a three-dimensional data model which reflects or represents the spatial structure and topography, respectively, of the surface of the object in at least a region thereof.

The generation of the at least partially three-dimensional data model comprises the use of a suitable topography detection apparatus which appropriately detects the radiation emanating from the object and calculates the data model on the basis of the thus obtained radiation data. To this end, use can be made of conventional topography detection apparatus and methods, such as line projection, pattern projection, photogrammetry and interferometric methods.

If the topography detection apparatus merely detects the three-dimensional structure of the surface of the object and does not detect surface properties of the object, such as color and texture, it is advantageous to also provide a detector device to detect, position-dependently, at least the color of the object surface in the region under examination and to provide corresponding color data.

The color information thus obtained is incorporated into the data model so that it is also represents colors of the object surface.

An advantageous photogrammetry method operates with two cameras which obtain images of the object at different viewing angles.

In this respect, it is again advantageous for a first one of the two cameras to record images of a larger region of the object with a lower spatial resolution and for a second camera to record merely images of a smaller partial region of the larger region with a higher spatial resolution. As a result, radiation data are obtained from the smaller partial region of the object which represent the three-dimensional topography of the object in said partial region. Accordingly, it is possible to generate a three-dimensional data model which represents the topography of the partial region of the object. From the region of the object which is observed merely by the first camera and which lies outside of the partial region observed also by the second camera there are thus radiation data obtained which are insufficient for generating a three-dimensional data model of this object region and merely represent the two-dimensional structure of the object in this region. However, these radiation data are also incorporated into the data model so that the latter also represents the entire object region observed by the first camera, said data model being then merely partially a three-dimensional data model.

If the partial region of the object which is also observed by the second camera is positioned centrally in the region of the object observed by the first camera, the user will perceive a three-dimensional, stereoscopic representation of the object with increased resolution in the center of his field of view. At the edge of his field of view he will perceive merely a two-dimensional representation of reduced resolution. The lack of a stereoscopic representation at the edge of the field of view is not always felt as disadvantageous by the user, while the increased resolution in the center of the field of view is perceived as advantageous.

The fixed point of the user coordinate system can be positioned within the region of the object under observation. When the object coordinate system and the user coordinate system are appropriately aligned relative to each other, the user, when viewing the stereoscopic display, will then perceive a representation of the object from the same perspective and direction of view as if he were viewing the object directly.

Alternatively, it is also possible to position the fixed point of the user coordinate system distant from the object so that the user and the object observed by the same can be spatially separated from one another.

BRIEF DESCRIPTION OF THE DRAWINGS

Embodiments of the invention are described in further detail below with reference to drawings, wherein FIG. 1 schematically shows a beam path of a conventional stereomicroscope, FIG. 2 schematically shows part of a beam path of a conventional stereomicroscope, FIG. 3 schematically shows an embodiment of a stereomicroscopy system according to the invention.

DETAILED DESCRIPTION

Figure 1:
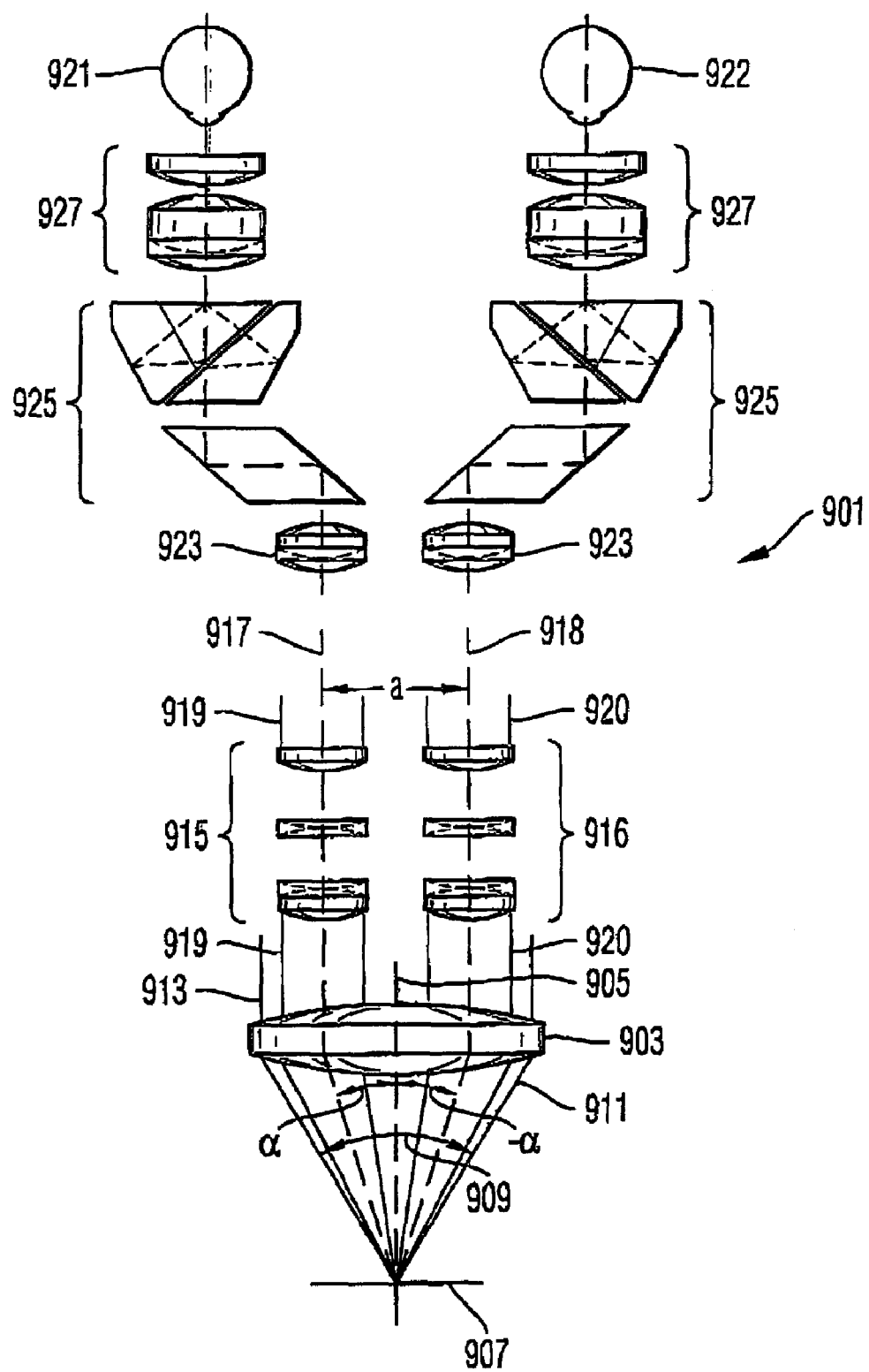
Figure 2:
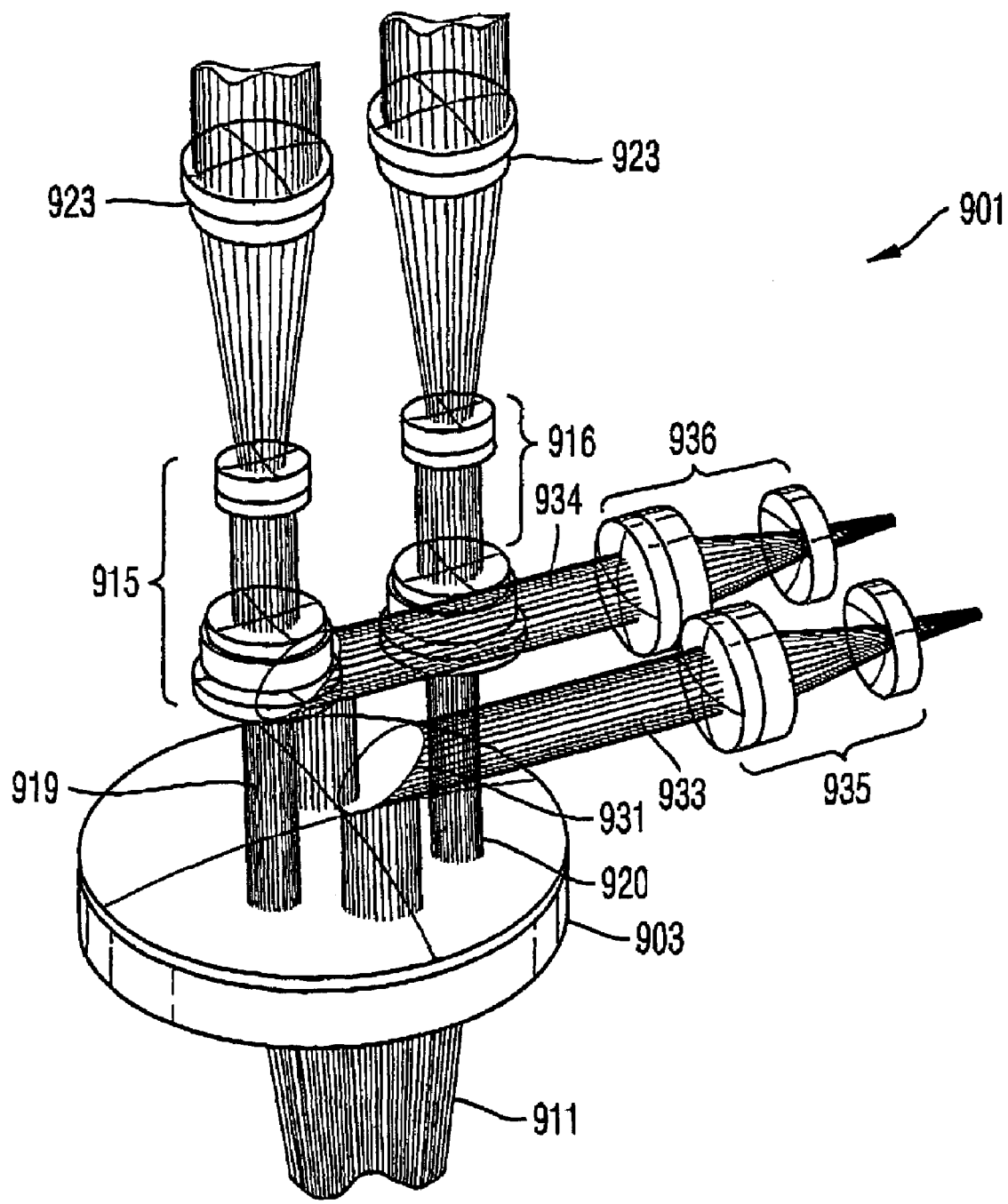
Figure 3:
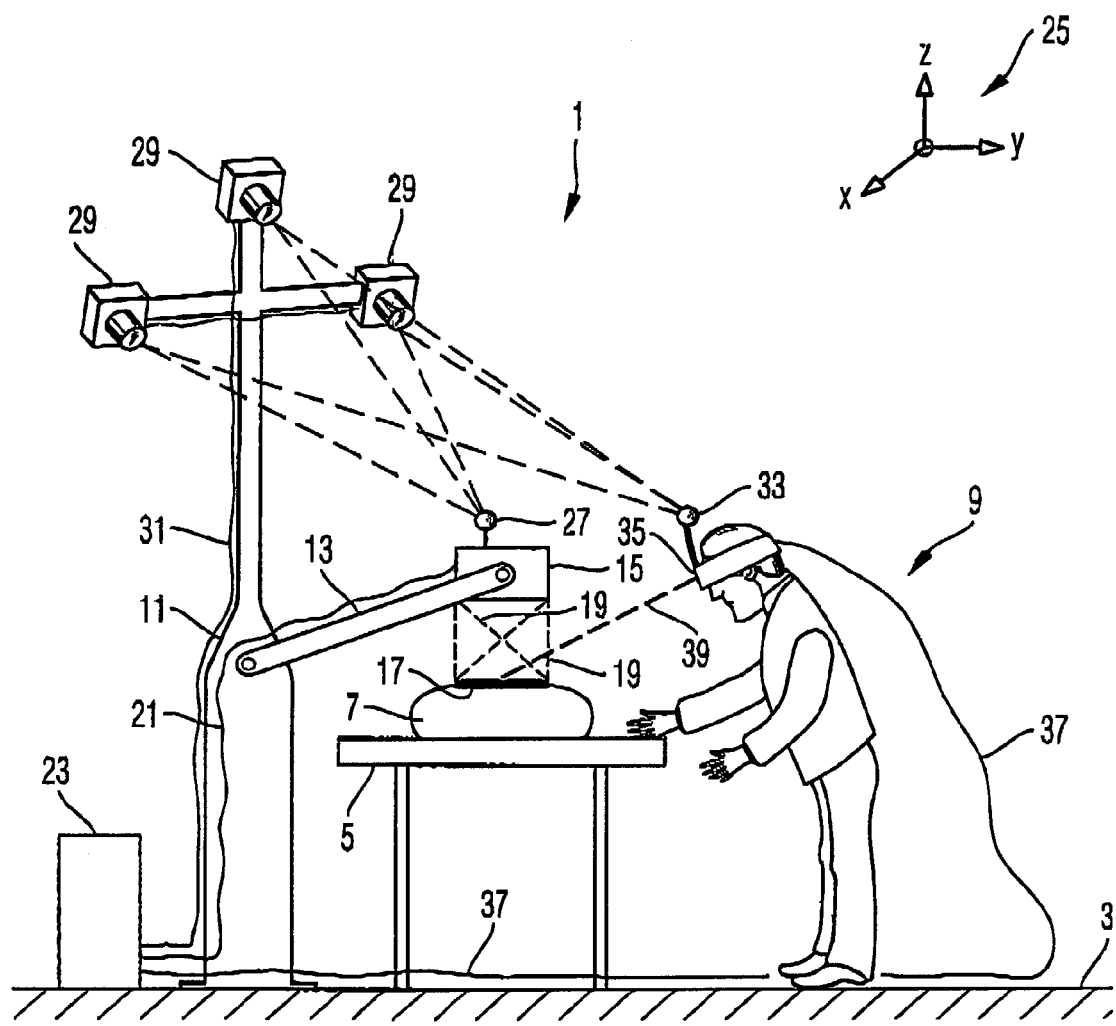

FIG. 3 shows an operating room in which a stereomicroscopy system 1 according to the invention is installed. An operating table 5, on which a patient 7 lies on whom a microsurgery is being performed by a surgeon 9, is fixedly mounted on a floor 3 of the operating room. A stand 11 is fixedly mounted on the floor 3 of the operating room, said stand 11 pivotally holding a topography detection apparatus 15 on a pivotal arm 13 which is positioned above the patient 7 such that the topography detection apparatus 15 can record a surface geometry or topography of a region 17 of the patient 7. The topography detection apparatus 15 operates optically. In FIG. 3 optical beams which emanate from the region 17 of the patient 7 and are recorded by the topography detection apparatus 15 are schematically shown as dotted lines 19.

The topography detection apparatus 15 obtains radiation data from this radiation 19 which are transmitted to a computer 23 via a data line 21. On the basis of the thus obtained radiation data, the computer 23 reconstructs a three-dimensional structure or topography of the region 17 of the patient 7 as three-dimensional data model. This means that in a memory area of the computer there is a digital representation which is representative of the geometry or topography of the region 17 of the patient 7. This data model is calculated in respect of a coordinate system x, y, z which is symbolically represented in FIG. 3 below the reference sign 25.

In order to correctly transform the three-dimensional data model into the coordinate system 25 of the operating room, the topography detection apparatus 15 carries a light-emitting diode 27, the radiation of which is recorded by three cameras 29 which are mounted spaced apart from each other on the stand 11 and whose position in the coordinate system 25 of the operating room is known. The images of the cameras 29 are transmitted to the computer 23 via a data line 31, said computer calculating a position of the topography detection apparatus 15 in the coordinate system 25 of the operating room on the basis of the images received. Accordingly, the radiation data obtained from the topography detection apparatus 15 are correctly incorporatable into the coordinate system 25 of the operating room.

It is also possible to provide three light-emitting diodes 27 spaced apart from each other so that an orientation of the topography detection apparatus 15 can be calculated as well in addition to the position thereof. In this case, the light-emitting diodes 27 can be provided to be distinguishable from each other by different light colors and/or blink frequencies.

The surgeon 9 carries a light-emitting diode 33 on his head, the position of which in the coordinate system 25 of the operating room being likewise detected by the cameras 29 and evaluated by the computer 23. Accordingly, the computer 23 also detects the exact position of the surgeon 9 in the coordinate system 25. Furthermore, the surgeon carries on his head a head-mounted display 35 which supplies a separate representation of the region 17 of the patient 7 to each eye of the surgeon 9. The image data required for these representations for the two eyes of the surgeon are generated by the computer 23 from the three-dimensional data model of the region 17 of the patient 7, and it supplies said image data to the display 35 via a data line 37.

In so doing, the computer 23 generates the image data such that the surgeon 9, when viewing the stereoscopic representation presented to him, gets an impression of the region 17 of the patient 7 as if he were directly viewing the region 17, as it is symbolically represented in FIG. 3 by a dotted sightline 39.

Figure 4:
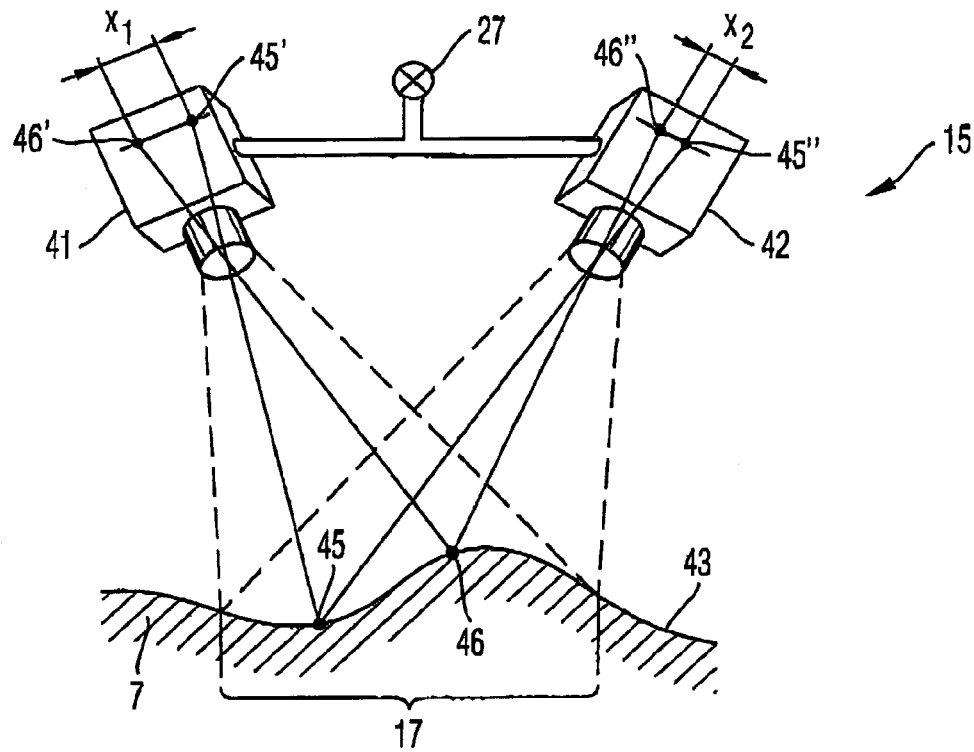
FIG. 4 shows a topography detection apparatus for use in the system shown in FIG. 3.

FIG. 4 shows a part of the topography detection apparatus 15 in detail. The topography detection apparatus 15 works on a photogrammetry principle. To this end, it comprises two cameras 41 and 42 which are positioned spaced apart from each other such that each one of the cameras 41, 42 can record an image of a region 17 of a surface 43 of the patient 7. Due to the distance between the two cameras 41, 42, they take pictures of the region 17 at different viewing angles. As a result, the pictures taken by the cameras 41, 42 differ from each other. This is illustrated by the points 45, 46 shown exemplarily in FIG. 4. The two points 45, 46 are imaged in an image plane of the camera 41 as images 45' and 46', respectively, which are spaced apart from each other by a distance $x_1$ which is larger than a distance $x_2$ which image points 45" and 46" are spaced apart from each other in an image plane of the camera 42.

By appropriately evaluating the images and radiation data, respectively, supplied by the cameras 41 and 42, the computer 23 can then obtain a data model of the region 17 of the surface 43 of the patient 7.

Further examples of photogrammetry methods and apparatus for this purpose are indicated, for example, in U.S. Pat. No. 6,165,181, the full disclosure of which is incorporated herein by reference. Further examples of photogrammetry methods are given in the references cited in said document.

Figure 5:
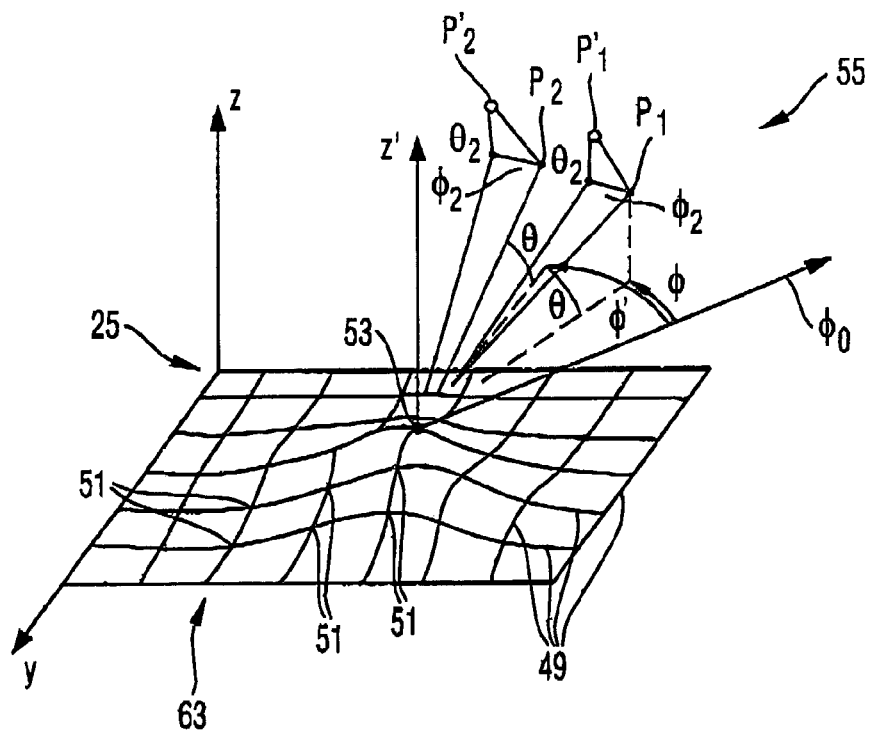
FIG. 5 illustrates a data model for the stereomicroscopy system shown in FIG. 3.

The data model calculated for the region 17 is schematically shown in FIG. 5 as a system of grid lines 49. A data set of coordinates x, y and z of the intersections 51 is allocated to each intersection 51 of the grid lines 49. The three-dimensional data model is thus represented by a plurality of number triplets which are representative of the coordinates of the surface 43 of the patient 7 in the region 17 in the coordinate system 25 of the operating room. Still further data sets can be allocated to each intersection 51 which are, for example, representative of color values or other properties of the object under observation at the respective locations.

This above-described representation of the data model in the memory of the computer 23 is, however, exemplary. There is a plurality of other memory techniques known for data models which are representative of three-dimensional structures in space.

At an intersection of the grid lines 49 disposed in a central region of the data structure, there is positioned a fixed point 53 which serves, on the one hand, as point of origin of a user coordinate system 55 and, on the other hand, as center of a central region of the object 7 which is presented to the surgeon 9 such that the latter gets the impression that his view 39 is directed to said fixed point 53 of the central region. The position of the surgeon 9 in the user coordinate system 55 is expressed by azimuths $\phi$ about a vertical axis z' oriented parallel to the z axis of the object coordinate system 25, and that proceeding from an arbitrary straight $\phi_0$ extending horizontally in the object coordinate system 25.

Two locations $P_1$ and $P_2$ are determined in the object coordinate system 25, for example, as coordinates x, y, z which, in the user coordinate system 55, have different azimuths $\phi$ and $\phi'$ and the same elevation $\theta$. The elevation $\theta$ can be the elevation at which the sightline 39 of the surgeon strikes the region 17 of the object 7. An average value between the two azimuths $\phi$ and $\phi'$ corresponds approximately to the azimuth at which the surgeon 9 is oriented relative to the patient 7. The difference between $\phi$ and $\phi'$ can have a predetermined value, such as about 20°, for example. However, it may also be selected as a function of a distance of the surgeon 9 from the fixed point 53 and decrease with increasing distance.

The computer 23 generates the image data for the representation of the region 17 of the patient 7 by the head-mounted display 35 such that a representation is presented to the left eye of the surgeon 9 as it would appear upon observation of the three-dimensional data model from location $P_1$, whereas the image data for the representation which is presented to the right eye are generated such that the three-dimensional data model appears as viewed from location $P_2$.

If the position of the surgeon 9 in the user coordinate system 55 changes azimuthally by an angle $\Phi_2$ and elevationally by an angle $\theta_2$, the locations $P_1$ and $P_2$ are shifted in the object coordinate system 25 to locations $P_1'$ and $P_2'$ such that the new positions thereof have changed azimuthally by the angle $\Phi_2$ and elevationally likewise by the angle $\theta_2$ in respect of the fixed point 53 as compared to the previous positions.

Figure 6:
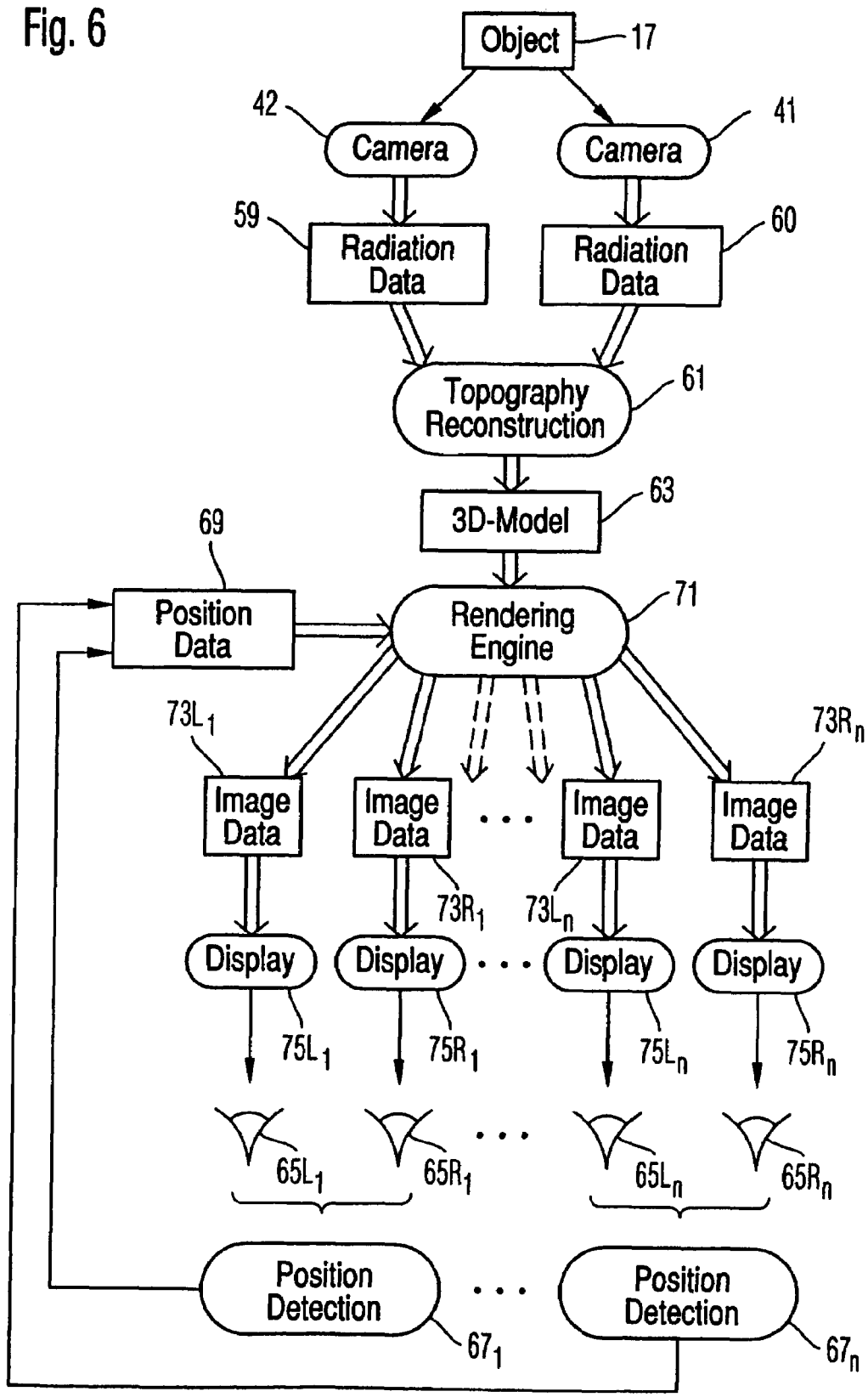
FIG. 6 shows a flow chart of the stereomicroscopy method described with reference to the stereomicroscopy system shown in FIG. 3.

In the following, the stereomicroscopy method is again described with reference to the flow chart of FIG. 6.

The object 17 is recorded by the two cameras 41 and 42 from different perspectives. The cameras 41, 42 supply radiation data 59, 60, which correspond to the pictures taken by the same, to the computer 60, said computer generating a three-dimensional data model 63 of the object 17 under observation from the radiation data 59 and 60 by means of a topography reconstruction software module 61.

The stereomicroscopy system can present representations of the object under observation to left eyes 65L and right eyes 65R of several users. To this end, a position detection apparatus 67 is allocated to each user for detecting the position, for example, of a point at the user's head between the two eyes 65L, 65R in the user coordinate system 55 and for generating corresponding position data 69. These position data are supplied to a representation generator or rendering engine 71 which generates image data from the 3D model 63 which are supplied to displays 75 viewed by the user's eyes 65.

The rendering engine 71 generates for each user image data 73L and 73R which generate representations for the left eye 65L and the right eye 65R of said user on displays 75L and 75R, respectively. Accordingly, representations of the object 7 are thus presented to each user via the displays 75L and 75R which are perceived by the user as if he viewed the object 17 from a perspective which corresponds to the perspective as if the user viewed the object 17 directly from his standpoint.

In the above-described embodiment, the fixed point 53 of the user coordinate system in which the position of the user is detected is disposed centrally in the region 17 of the object 7 under observation. This is appropriate if the user is to perform manipulations directly on the object 7 under observation, as it applies to the case of the surgeon in the operating room shown in FIG. 3.

However, it is also possible for the user to be positioned remote from the object under observation and thus the fixed point of the user coordinate system does not coincide with the region of the object under observation. An example for such an application would be a telesurgical method wherein the surgeon is positioned distant from the patient and performs the operation on the patient by means of a remote-controlled robot. In this case, the fixed point for determining the position data 69 is then positioned in the field of view of the surgeon or user, and an image is defined between the user coordinate system and the coordinate system of the operating room by means of which the fixed point in front of the surgeon can be transferred, for example, into the region of the patient under observation. By moving his head, the surgeon positioned remote from the patient is then also able to obtain impressions from the patient under operation from different perspectives.

It is also possible to position the observer remote from the object under observation if, for example, there is only space for a few people at the operating table and further persons, for example, students wish to observe the operation directly "flesh-and-blood". These person can then be positioned outside of the operating room. A fixed point and its orientation in the user coordinate system can be determined in space for each one of these persons so that, when viewing their head-mounted display, they get the impression as if the region of the patient under observation were disposed around this very, namely, their personal fixed point.

In the following, variants of the embodiment of the invention illustrated with reference to FIGS. 1 to 6 are described. Components which correspond to each other in structure and function are designated by the same reference numbers as in FIGS. 1 to 6. For the purpose of distinction, they are, however, supplemented by an additional letter. For the purpose of illustration, reference is taken to the entire above description.

Figure 7:
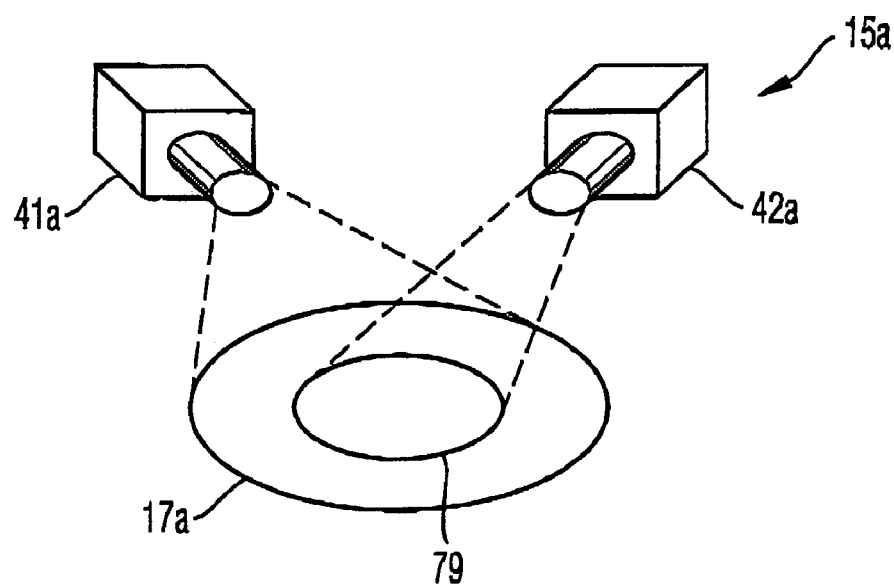
FIG. 7 shows a variant of the topography detection apparatus shown in FIG. 4.

FIG. 7 schematically shows a topography detection apparatus 15a which is similar to the topography detection apparatus shown in FIG. 4 in that it likewise works on the photogrammetry principle. A camera 41a records an image of a larger region 17a of the object under observation. A further camera 42a records an image of a smaller partial region 79 disposed centrally in the region 17a recorded by the camera 41a. Both cameras 41a and 42a have the same resolution capability, i.e., the numbers of their light-sensitive pixels is the same. Accordingly, the camera 41a achieves with the pictures taken and the image data generated by the camera 41a, respectively, a lower resolution at the object under observation than the camera 42a. In the partial region 79, the object is recorded from two different perspectives by the cameras 41a and 42a so that a three-dimensional data model can be reconstructed in this partial region 79 which is representative of the spatial structure of the object in this partial region 79. However, it is not possible to reconstruct the structure of the object three-dimensionally for the part of the region 17a which lies outside of the partial region 79. However, the (two-dimensional) radiation data of the camera 41a are used for the part of the region 17a which lies outside of the partial region 79 for providing a corresponding two-dimensional representation of the object in this region.

Figure 8:
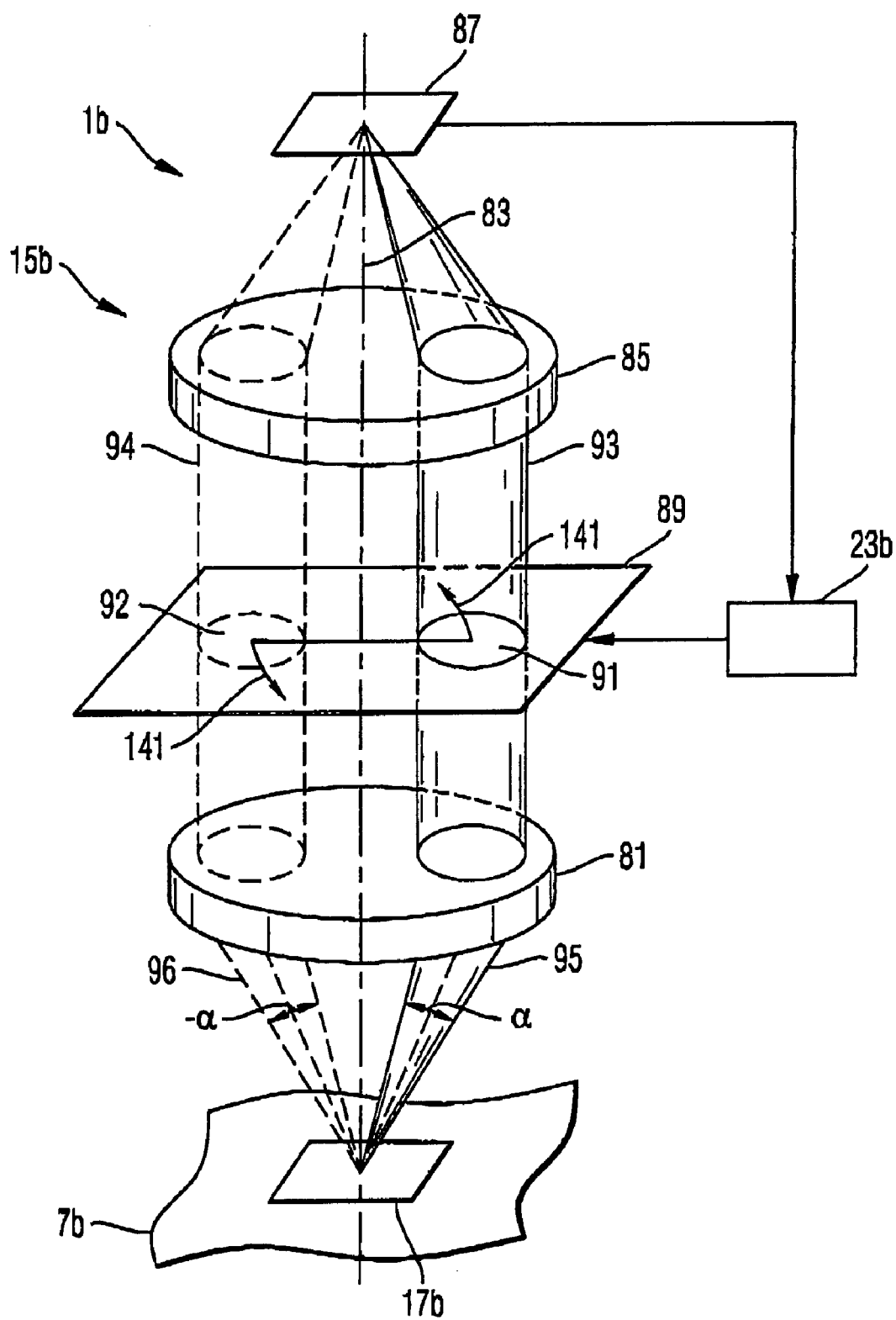
FIG. 8 shows a further variant of the topography detection apparatus shown in FIG. 4.

FIG. 8 shows a variant of the topography detection apparatus shown in FIGS. 4 and 7. A topography detection apparatus 15b shown in FIG. 8 likewise forms part of a stereomicroscopy system 1b and comprises a microscope objective 81 with an optical axis 83. An object 7b is positioned in an object plane of the objective 81. The objective 81 images the object 7b to infinity. Furthermore, a lens system 85 is disposed along the optical axis 83 spaced apart from the objective 81 such that an image of the region 17b of the object 7b under observation is formed on a CCD chip 87 positioned in an image plane of the lens system 85.

In a parallel beam path between the objective 81 and the lens system 85, there is disposed a switchable stop 89, the switching state of which is controlled by a computer 23b.

The radiation data recorded by the CCD chip 87 are supplied to the computer 23b.

The switchable stop 89 has a plurality of separately controllable liquid crystal elements. Outside of two circular, spaced apart regions 91 and 92, the liquid crystal elements are always in a switching state in which they do not allow light to pass through. The circular regions 91 and 92 are alternately switched to a substantially light-permeable state and a substantially light-impermeable state.

In the switching state shown in FIG. 8, the region 91 is switched to its light-permeable state, while the region 92 is switched to its light-impermeable state. Accordingly, a partial beam bundle 93 of the complete beam bundle emanating from the objective 81 passes through the switchable stop 89 and is imaged on the CCD chip 87 by the lens system 85. Accordingly, only light of a conical beam bundle 95 emanating from the region 17b under observation at an angle α in respect of the optical axis 83 impinges on the chip 87. The chip 87 thus records an image of the region 17b under observation as it appears when viewed at an angle α in respect of the optical axis 83. Radiation data which are representative of this image are transmitted to the computer 23b.

The computer 23b then controls the stop 89 to switch the liquid crystal elements to their light-impermeable state in the region 91, while the liquid crystal elements are switched to their light-permeable state in the region 92. Accordingly, a partial beam bundle 94 passes through the stop 89 which corresponds to a conical beam bundle 96 emanating from the object 7b at an angle $-\alpha$ in respect of the optical axis 83 and which is also imaged on the detector 87 by the lens system 85. The detector 87 thus records an image of the object 7b at an angle $-\alpha$ in respect of the optical axis in this switching state. This image, too, is transmitted as radiation data to the computer 23b.

Accordingly, the computer 23b receives, successively in time, radiation data of the object at respectively different directions of view onto the object. On the basis of these radiation data, the computer 23b can in turn generate a three-dimensional data model of the object 7b, as it has already been described above.

Figure 9:
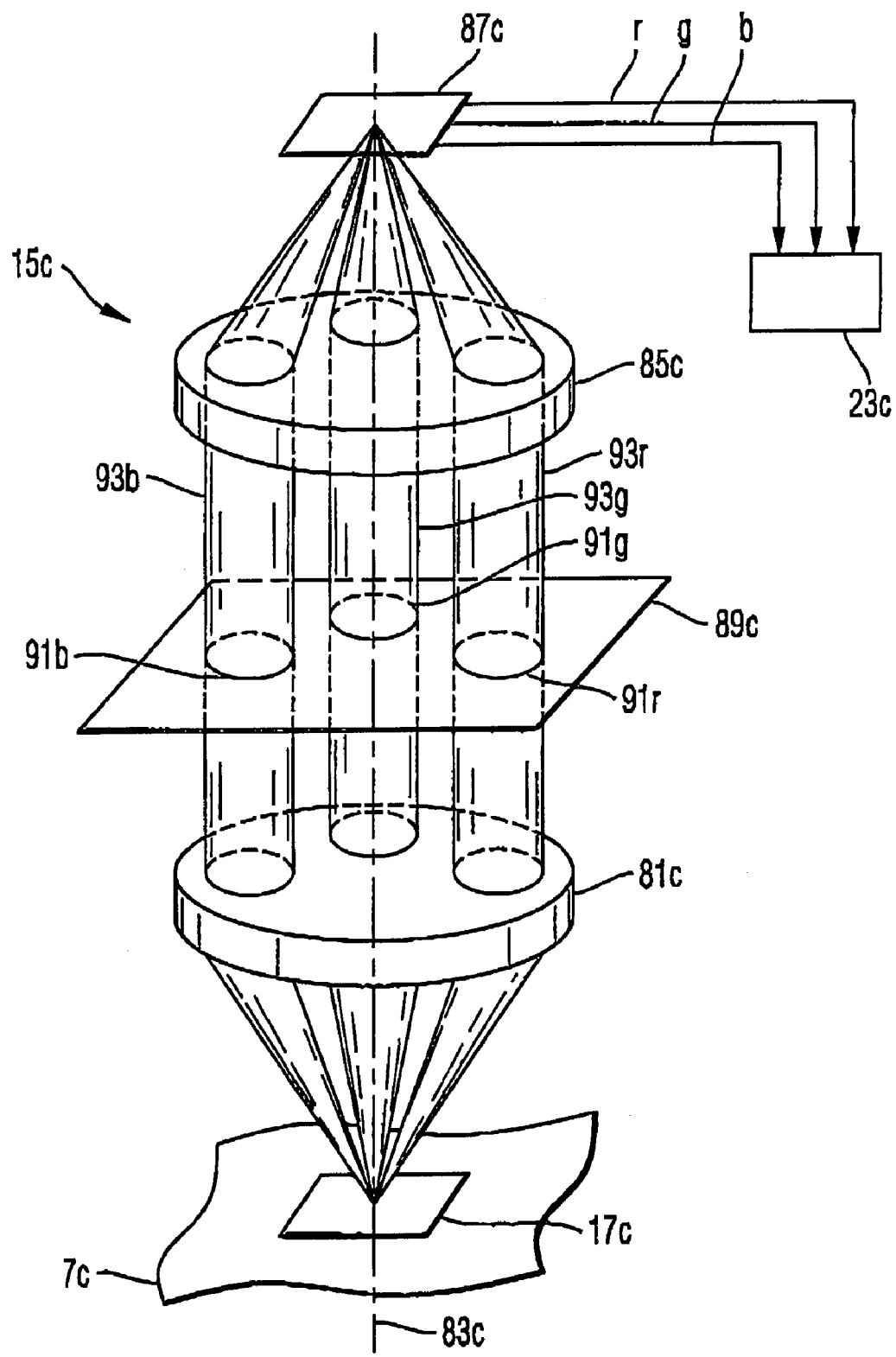
FIG. 9 shows a still further variant of the topography detection apparatus shown in FIG. 4.

FIG. 9 shows a further variant of the topography detection apparatus shown in FIG. 8. In contrast to the topography detection apparatus shown in FIG. 8, the apparatus 15c shown in FIG. 9 records images from different perspectives of an object 7c not successively in time, but simultaneously. To this end, a color CCD chip 87c is disposed on an optical axis 83c on which a lens system 85c and an objective 81c and a region 17c of the object 7c under observation are disposed such that the region 17c under observation is imaged on the color CCD chip 87c, and a parallel beam path is formed between the lens system 85c and the objective 81c. Between the objective 81c and the lens system 85c, there is disposed a stop 89c which is light-impermeable, except for circular regions 91r, 91g, 91b. The light-permeable regions 91r, 91g, 91b are disposed spaced apart from each other and from the optical axis 83c and circumferentially distributed about the same. The circular region 91r allows only red light to pass through, the region 91g allows only green light to pass through, and the region 91b allows only blue light to pass through. The color CCD chip 87c supplies radiation data for each of the colors red, green and blue to the computer 23c. The images of the object 17c recorded in the different spectral colors have thus each been recorded from different perspectives and angles in respect of the optical axis 83c. By appropriately evaluating these radiation data, the computer 23c can, in turn, generate a three-dimensional data model of the object 7c.

Figure 10:
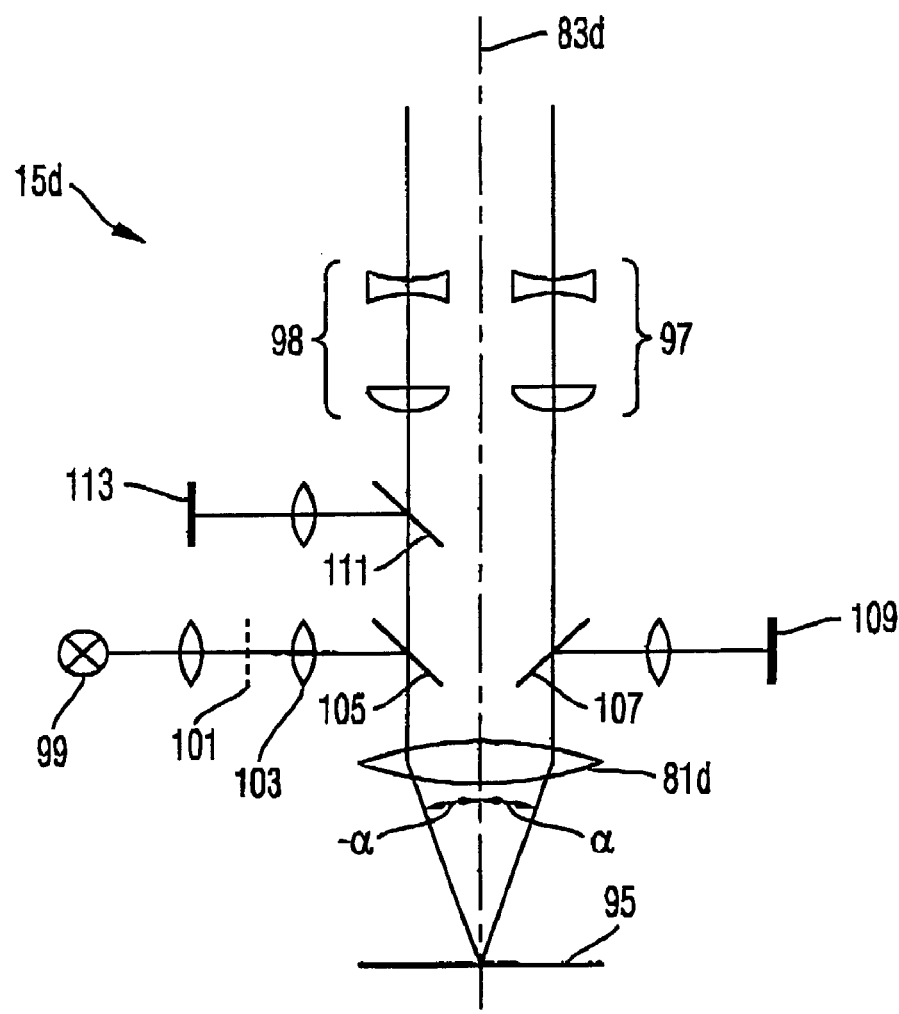
FIG. 10 shows a still further variant of the topography detection apparatus shown in FIG. 4.

FIG. 10 schematically shows a further variant of a topography detection apparatus 15d which works on a pattern projection principle. The structure of the topography detection apparatus is similar to that of the conventional microscope shown in FIG. 1 and comprises an objective 81d which is disposed along an optical axis 83d, an object to be observed being disposable in the object plane 95 thereof. Two zoom systems 97 and 98 are provided spaced apart from the optical axis 83d which are allocated to a left eye and a right eye of a user, respectively, so that the user can observe the object also directly through the microscope in conventional manner. In addition to the conventional observation of the object, there is provided an infrared light source 99 which illuminates a stop 101 which is imaged in the object plane 95. To this end, a condenser 103 is provided as well as a dichroidic mirror 105 to feed the image of the stop 101 into the beam path of the microscope such that the light of the infrared light source 99 passing through the stop 101 passes also through the objective 81d of the microscope. The stop 101 has a grid structure which is imaged by the infrared light in the object plane 95. Accordingly, a pattern projected with infrared light is formed in the object plane 95, with infrared light being reflected by those regions of the object surface which are illuminated with infrared light.

Here, the projection of the pattern onto the object is effected at an angle $-\alpha$ in respect of the optical axis 83d. The infrared light reflected by the object which returns to the objective 81d at an angle $\alpha$ in respect of the optical axis 83d is fed out of the beam path of the microscope by means of a dichroidic mirror 107 and imaged on an infrared camera 109.

By evaluating the image obtained by the camera 109 it is thus possible to reconstruct the three-dimensional structure of the object under observation and to record it as three-dimensional data model. This three-dimensional data model, in turn, can be used for generating representations for a user who views these representations via a stereo display system.

Further examples of pattern projection methods are indicated, for example, in U.S. Pat. No. 4,498,778, in U.S. Pat. No. 4,628,469 and in U.S. Pat. No. 5,999,840, the full disclosure of each document being incorporated herein by reference.

Although the reconstruction of the topography of the object on the basis of the projected pattern allows to reconstruct the three-dimensional structure of the object, it is not possible to obtain also information on the surface color solely by the pattern projection. Therefore, a semi-transparent mirror 111 is positioned in the beam path of the microscope to feed light out for a camera 113 which is sensitive in the visible range. The radiation data of said camera are used to incorporate color information into the three-dimensional data model of the object generated on the basis of the radiation data obtained from the camera.

Figure 11:
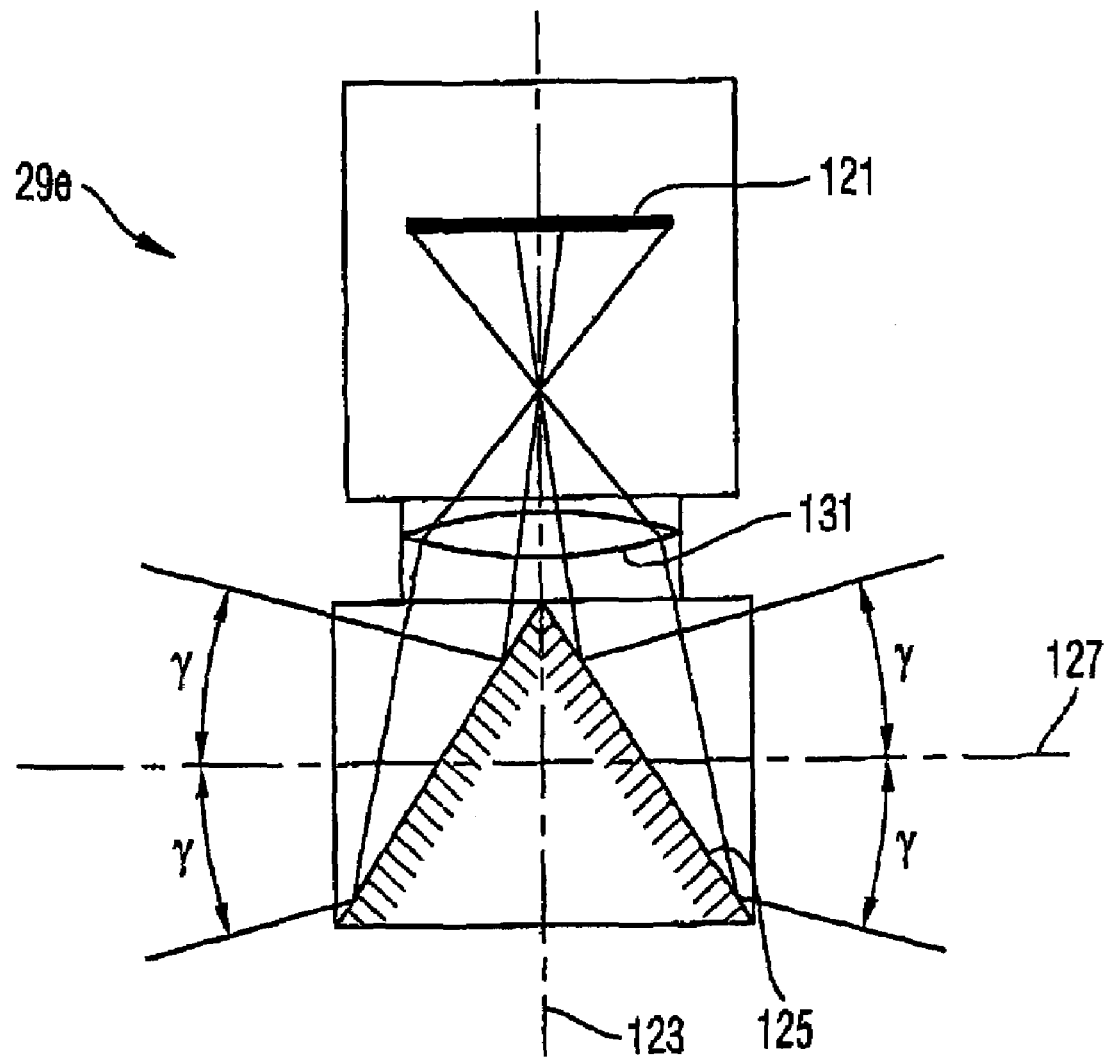
FIG. 11 shows a variant of the position detection apparatus shown in FIG. 3.

FIG. 11 schematically shows a variant of a position detection apparatus 29e. For example, it could be mounted directly on or at the topography detection apparatus shown in FIG. 3 for detecting a position of the user in the operating room relative to the topography detection apparatus.

To this end, an optical axis 123 of the position detection apparatus 29e would have to be oriented vertically in the operating room. The position detection apparatus 29e comprises a conical mirror 125 which reflects radiation impinging on the mirror 125 at an angle of $\pm\gamma$ in respect of a horizontal plane 127 onto an optical system 131 which images the radiation on a CCD chip 121.

This system 29e allows to locate a user carrying a light source at his head in the operating room, because his azimuthal position about the axis 123 as well as his elevation in respect of the plane 127 in a range $\pm\gamma$ is determinable by evaluation of the image of the CCD chip 121. If there are several users in the operating room, it is possible for each user to carry a light source, the light intensity of which changes time-dependently, a separate characteristic time pattern for the light intensity being provided for each user. By evaluating the image of the camera 121 and taking into consideration the recorded time pattern, it is thus possible to detect the position of each one of the users.

With the topography detection apparatus shown in FIG. 8 it is possible to supply a stereoscopic image of the object, position-dependently, to a user without a complete three-dimensional data model of the object having to be reconstructed. The camera 87 shown in said Figure records images successively in time and corresponding radiation data are supplied which correspond to different directions of view $-\alpha$ and $\alpha$, respectively, onto the object 7b. These radiation data can now be used directly as image data for producing representations for the user's left eye and the right eye, respectively. For example, the radiation data which are obtained when the region 91 is light-permeable and the region 92 is light-impermeable can be used as image data for the right eye, and the radiation data which are obtained when the region 92 is light-permeable and the region 91 is light-impermeable can be used as image data for the left eye. As a result, a full stereoscopic impression of the object 7b is produced for the observer when he views these representations.

If the user changes his position azimuthally about the optical axis 83 of the objective, it is then also possible to likewise shift the alternately light-permeable and light-impermeable regions 91 and 92 azimuthally about the optical axis, which is enabled by correspondingly controlling the liquid crystal elements of the switchable stop 89. This displacement of the regions 91 and 92 is indicated in FIG. 8 by arrows 141.

The invention claimed is:

1. A stereomicroscopy method for generating at least a pair of representations of an object for observation by a first user and a second user, comprising:
    detecting radiation reflected from a surface region of the object and providing radiation data corresponding to the detected radiation, and generating a data model from the radiation data,
    and for each of the first user and the second user,
        detecting a first position of the user relative to a fixed point in a user coordinate system,
        determining a first location and a second location relative to the surface region of the object in the object coordinate system,
        generating image data for a first representation and a second representation from the data model, the first representation representing the surface region of the object viewed from the first location and the second representation representing the surface region of the object viewed from the second location, and
        supplying the image data to a display and displaying the first representation for a left eye of the user and displaying the second representation for a right eye of the user, and subsequently:
        detecting a second position of the user relative to the fixed point and, if the second position has changed as compared to the first position: displacing the first location together with the second location relative to the surface region of the object in the object coordinate system, and subsequently
        generating image data for a new first representation and a new second representation from the data model, the new first representation representing the surface region of the object viewed from the displaced first location and the new second representation representing the surface region of the object viewed from the displaced second location,
        wherein the detecting of radiation takes place between the detecting of the first position and the generating of image data for the new first representation and the new second representation, and wherein the image data for the first user and the second user are generated from the same data model.

2. The stereomicroscopy method according to claim 1, further comprising: determining azimuths and elevations of the first location and the second location relative to the surface region of the object in the object coordinate system, the azimuths of the first and second location being different from each other.

3. The stereomicroscopy method according to claim 2, further comprising: if an azimuth of the second position has changed as compared to an azimuth of the first position by a first angle, the first location and the second location are both azimuthally displaced by a second angle.

4. The stereomicroscopy method according to claim 3, wherein an amount of the first angle is substantially equal to an amount of the second angle.

5. The stereomicroscopy method according to claim 2, further comprising: if an elevation of the second position has changed as compared to an elevation of the first position by a third angle, the first location and the second location are both elevationally displaced by a fourth angle.

6. The stereomicroscopy method according to claim 5, wherein an amount of the third angle is higher than or substantially equal to an amount of the fourth angle.

7. The stereomicroscopy method according to claim 1, wherein the positions of a plurality of users are detected, the first and second locations being allocated to each one of the users as a function of the detected position of the respective user and image data being produced for each user corresponding to an observation of the object from the first location and the second location, respectively, allocated to the respective user.

8. The stereomicroscopy method according to claim 1, wherein the generation of the image data from the radiation data comprises:
    generating from the radiation data an at least partially three-dimensional data model in the object coordinate system which is representative of a topography of a the surface region of the object, and
    generating from the data model the image data for the first representation and the second representation.

9. The stereomicroscopy method according to claim 8, wherein the generation of the data model comprises the application of a pattern projection method or/and of a photogrammetry method.

10. The stereomicroscopy method according to claim 1, wherein the fixed point is disposed within the surface region of the object.

11. A stereomicroscopy method for generating at least a pair of representations of an object for observation by a first user and a second user, comprising:
    detecting radiation reflected from a surface region of the object and providing radiation data corresponding to the detected radiation, and generating a data model from the radiation data,
    and for each of the first user and the second user,
        detecting a first position of the user relative to a fixed point in a user coordinate system,
        determining a first location and a second location relative to the surface region of the object in the object coordinate system,
        generating image data for a first representation and a second representation from the data model, the first representation representing the surface region of the object viewed from the first location and the second representation representing the surface region of the object viewed from the second location, comprising:
            generating from the data model an at least partially three-dimensional data model in the object coordinate system which is representative of a topography of the surface region of the object, and
            generating from the at least partially three-dimensional data model the image data for the first representation and the second representation;
        supplying the image data to a display and displaying the first representation for a left eye of the user and displaying the second representation for a right eye of the user, and subsequently:
        detecting a second position of the user relative to the fixed point and, if the second position has changed as compared to the first position: displacing the first location together with the second location relative to the surface region of the object in the object coordinate system, and subsequently generating image data for a new first representation and a new second representation from the data model, the new first representation representing the surface region of the object viewed from the displaced first location and the new second representation representing the surface region of the object viewed from the displaced second location, wherein the detecting of radiation takes place between the detecting of the first position and the generating of image data for the new first representation and the new second representation, and wherein the image data for the first user and the second user are generated from the same data model, and wherein the detecting of the radiation reflected from the surface region of the object comprises a detection of a color of radiation reflected from locations of the surface region and the color radiation data provided comprise color data corresponding to the color, and wherein the data model is generated such that it is also representative of colors of the surface region of the object.

12. A stereomicroscopy system for generating at least a pair of representations of an object for observation by a first user and a second user, comprising a detection system for detecting radiation reflected from a surface region of the object and for providing radiation data corresponding to the detected radiation, a computer having a memory adapted to store a digital representation of the object's topography, a position detection apparatus for detecting a first position of the first user and a first position of the second user relative to a fixed point in a user coordinate system, a location determination device for determining a first and a second location for the first user and a first and a second location for the second user in an object coordinate system depending on the user positions in the user coordinate system, an image data generation device for generating image data from the radiation data for a first representation and a second representation for each user, the first representation respectively representing the surface region of the object viewed from the first location and the second representation respectively representing the surface region of the object viewed from the second location, and display apparatuses for the first and second users for displaying the first representation for a left eye of the respective user and for displaying the second representation for a right eye of the respective user as a function of the respective image data, wherein the detection system is adapted for detecting the radiation reflected from the surface region of the object after the position detection apparatus has detected the first positions of the users, and wherein the image data generation device is adapted to render different image data from the same digital representation for the first and second users.

13. The stereomicroscopy system according to claim 12, wherein the image data generation device comprises:

a topography detection apparatus for generating an at least partially three-dimensional data model representing a topography of the surface region of the object in the object coordinate system and a rendering engine for generating the first representation and the second representation from the data model.

14. The stereomicroscopy system according to claim 13, wherein the detection system comprises a color detector for detecting a color of radiation reflected from locations of the surface, and wherein the color radiation data provided comprise color data corresponding to the color, and wherein the topography detection apparatus is provided to generate the three-dimensional data model such that it also represents colors of the surface of the object.

15. The stereomicroscopy system according to claim 13, wherein the detection system comprises:

a radiation projector for projecting a radiation pattern onto the surface region of the object, and a detector for detecting radiation of the radiation projector reflected from the surface region of the object.

16. The stereomicroscopy system according to claim 15, wherein the detection system comprises an objective with at least one lens and an object plane for positioning the surface region of the object, and wherein the projected beam pattern and the reflected radiation pass through the at least one lens.

17. The stereomicroscopy system according to claim 13, wherein the detection system comprises at least one camera for producing at least two images of the surface region of the object at respectively different angles of view.

18. The stereomicroscopy system according to claim 17, wherein the at least one camera is provided for producing the at least two images successively in time, and wherein a switchable radiation guidance is provided for accordingly supplying at least two beam bundles to the at least one camera, said beam bundles being reflected from the surface region of the object in different directions.

19. The stereomicroscopy system according to claim 17, wherein the at least one camera comprises a color camera that is provided to record the at least two images in different spectral ranges, and wherein a radiation guidance is provided with at least two color filters having different spectral transmittance characteristics for respectively supplying to the color camera a beam bundle passing through the color filter, said beam bundles being reflected from the surface region of the object in different directions.

20. A stereomicroscopy system for generating at least a pair of representations of an object for observation by at least one user, comprising:

a detection system for detecting radiation reflected from a surface region of the object and for providing radiation data corresponding to the detected radiation, comprising:

two cameras for producing at least two images of the surface region of the object at respectively different angles of view, a position detection apparatus for detecting a first position of the user relative to a fixed point in a user coordinate system, a location determination device for determining a first and a second location in an object coordinate system depending on the user position in the user coordinate system, an image data generation device for generating image data from the radiation data for a first representation and a second representation, the first representation representing the surface region of the object viewed from the first location and the second representation representing the surface region of the object viewed from the second location, wherein the image data generation device comprises:

a topography detection apparatus for generating an at least partially three-dimensional data model representing a topography of the surface region of the object in the object coordinate system, and a rendering engine for generating the first representation and the second representation from the data model; and a display apparatus for displaying the first representation for a left eye of the user and for displaying the second representation for a right eye of the user as a function of the image data, wherein the detection system is adapted for detecting the radiation reflected from the surface region of the object after the position detection apparatus has detected the first position of the user, and wherein a first of the two cameras produces an image of the surface region of the object and a second of the two cameras produces an image of merely a part of the surface region, and wherein the data model generated by the topography detection apparatus represents the topography of the surface region three-dimensionally merely in the partial surface region and outside of the partial surface region two-dimensionally.

* * * * *